US012447706B2

(12) United States Patent
Kost et al.

(10) Patent No.: US 12,447,706 B2
(45) Date of Patent: Oct. 21, 2025

(54) MITER SIPE MACHINE HAVING ANGLE CONTROL, BLADE SHARPENING, AND TREAD SUPPORT

(71) Applicant: BRIDGESTONE BANDAG, LLC, Nashville, TN (US)

(72) Inventors: Troy A. Kost, Muscatine, IA (US); Jim L. Jones, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

(21) Appl. No.: 18/720,499

(22) PCT Filed: Dec. 6, 2022

(86) PCT No.: PCT/US2022/080961
§ 371 (c)(1),
(2) Date: Jun. 14, 2024

(87) PCT Pub. No.: WO2023/114663
PCT Pub. Date: Jun. 22, 2023

(65) Prior Publication Data
US 2024/0416605 A1   Dec. 19, 2024

Related U.S. Application Data

(60) Provisional application No. 63/291,183, filed on Dec. 17, 2021.

(51) Int. Cl.
*B29D 30/68* (2006.01)
*B29K 7/00* (2006.01)

(52) U.S. Cl.
CPC .......... *B29D 30/68* (2013.01); *B29K 2007/00* (2013.01)

(58) Field of Classification Search
CPC .. B29D 30/68; B29D 30/00; B29D 2030/685; B29D 30/56; B29K 2007/00
(Continued)

(56) References Cited

U.S. PATENT DOCUMENTS 2,157,151 A   5/1939   Stackhouse
2,243,461 A   5/1941   Haskins
(Continued)

FOREIGN PATENT DOCUMENTS

CN   107443467 A   12/2017
CN   111216279     6/2020
(Continued)

OTHER PUBLICATIONS

Tire sipe review URL: "https://www.youtube.com/watch?v=uiQtU9XbJyw", specifically time stamp 2:24 of 6:22; last accessed Feb. 19, 2025 (Year: 2016).*
(Continued)

*Primary Examiner* — Adam J Eiseman
*Assistant Examiner* — Fred C Hammers

(57) ABSTRACT

A sipe forming system is provided. The sipe forming system includes a cutting base including a pivot plate having an aperture, a cutting drum extending at least partially through the aperture, a blade coupled to the surface of the cutting drum, and a mechanical power source operably coupled to the cutting base and configured to rotate the cutting drum. The sipe forming system further includes a positioning assembly pivotally coupled to the cutting base and configured to receive a tire tread. The positioning assembly includes a housing, the housing being selectively positionable relative to the pivot plate, and at least one positioning device configured to position the tire tread received by the positioning assembly with respect to the cutting drum.

16 Claims, 14 Drawing Sheets

(58) Field of Classification Search
USPC .................................................. 83/875, 971
See application file for complete search history.

(56) References Cited

U.S. PATENT DOCUMENTS

| | | | |
|---|---|---|---|
| 3,082,506 A | 3/1963 | Jensen | |
| 3,384,146 A | 5/1968 | Sommer | |
| 3,683,728 A * | 8/1972 | Meserve | B29D 30/68 83/171 |
| 3,747,177 A | 7/1973 | Jensen | |
| 3,820,580 A | 6/1974 | Meserve et al. | |
| 3,868,795 A * | 3/1975 | Rees | B24B 3/46 451/422 |
| 3,993,115 A | 11/1976 | Greene et al. | |
| 4,072,072 A | 2/1978 | Harb | |
| 4,144,923 A | 3/1979 | Curry | |
| 4,609,026 A * | 9/1986 | Kondoh | B29D 30/68 157/13 |
| 9,434,214 B2 | 9/2016 | Iwamura | |
| 10,780,662 B2 | 9/2020 | Coel et al. | |
| 2013/0213539 A1 * | 8/2013 | Christenbury | B29D 30/0681 152/209.1 |
| 2019/0184760 A1 | 6/2019 | Cerny et al. | |

FOREIGN PATENT DOCUMENTS

| | | |
|---|---|---|
| EP | 0 119 839 A2 | 9/1984 |
| FR | 2190600 A1 | 6/1976 |
| JP | 2000-079599 A | 3/2000 |
| JP | 2006-312272 A | 11/2006 |
| JP | 5962282 B2 | 8/2016 |
| KR | 1020100002785 A | 1/2010 |

OTHER PUBLICATIONS

International Search Report and Written Opinion for PCT Application No. PCT/US2022/080961, dated May 1, 2023.
NHT88-1.2, National Highway Traffic Safety Administration, Washington, DC, US Department of Transportation, Jan. 1, 1988, pp. 1-6.
Tire Demon—Tire Scythe, Mar. 25, 2020, available at https://www.youtube.com/watch?v=t5_RPf3wNK4, accessed Jun. 14, 2024.

* cited by examiner

MITER SIPE MACHINE HAVING ANGLE CONTROL, BLADE SHARPENING, AND TREAD SUPPORT

CROSS-REFERENCE TO RELATED PATENT APPLICATIONS

This application is the U.S. National Phase of PCT Application No. PCT/US2022/080961, filed Dec. 6, 2022, which claims priority to and the benefit of U.S. Provisional Patent Application No. 63/291,183, filed Dec. 17, 2021, the entire contents of which are incorporated herein by reference.

BACKGROUND

In order to increase the grip of a tire, sipes are often cut through the tire tread to improve traction in certain conditions (e.g., wet, icy, muddy, snowy, etc.) that require improved grip performance to prevent slipping.

SUMMARY

In one embodiment a sipe forming system includes a cutting base including a pivot plate having an aperture, a cutting drum extending at least partially through the aperture, a blade coupled to the surface of the cutting drum, and a mechanical power source operably coupled to the cutting base and configured to rotate the cutting drum. The sipe forming system further includes a positioning assembly pivotally coupled to the cutting base and configured to receive a tire tread. The positioning assembly includes a housing, the housing being selectively positionable relative to the pivot plate, and at least one positioning device configured to position the tire tread received by the positioning assembly with respect to the cutting drum.

This summary is illustrative only and is not intended to be in any way limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As used herein, the term "tire tread" refers to the rubber on the circumference of a tire that makes contact with the ground. The tire tread is often manufactured separately from the rest of the tire, known as the "tire carcass."

As used herein, the term "sipe" refers to a slit within the tread of a tire. Sipes are intended to improve the grip of the tire (e.g., friction between the tire and the surface on which the tire is rolling). Similarly, "siping" refers to the process of forming sipes. Generally, "sipes" and "siping" refer to cut slits in tires and the process of cutting said slits.

As used herein, the terms "axial" and "axially" refers to the direction parallel to an axis.

As used herein, the terms "radial" and "radially" refer to the direction toward or away from a central axis.

As used herein, the terms "circumferential" or "circumferentially" refer to an arc along a round shape (e.g., along the circumference).

As noted above, sipes may be cut through a tire tread to improve traction in certain conditions. The angle and pattern of sipes on a tire tread affects the performance of the sipe; however, an effective (e.g., producing improved grip) angle and/or pattern may vary by need (e.g., wet conditions, muddy conditions, etc.) or type of tire (e.g., type of material, groove layout, etc.). Sipe cutting machines are generally configured to only cut sipes through the tire tread at a certain angle. Furthermore, sipe cutting machines often cut shallow sipes in the tire tread. As the tire tread wears down, the sipes wear down, reducing the effectiveness of the sipe. A sipe cutting machine that cuts deep sipes of varying angles can save manufacturing expenses. Furthermore, the ability to cut a deep sipe may increase the performance of the tire, as the sipe performance experiences less reduction in effectiveness as the tire tread wears down during use.

Figure 1:
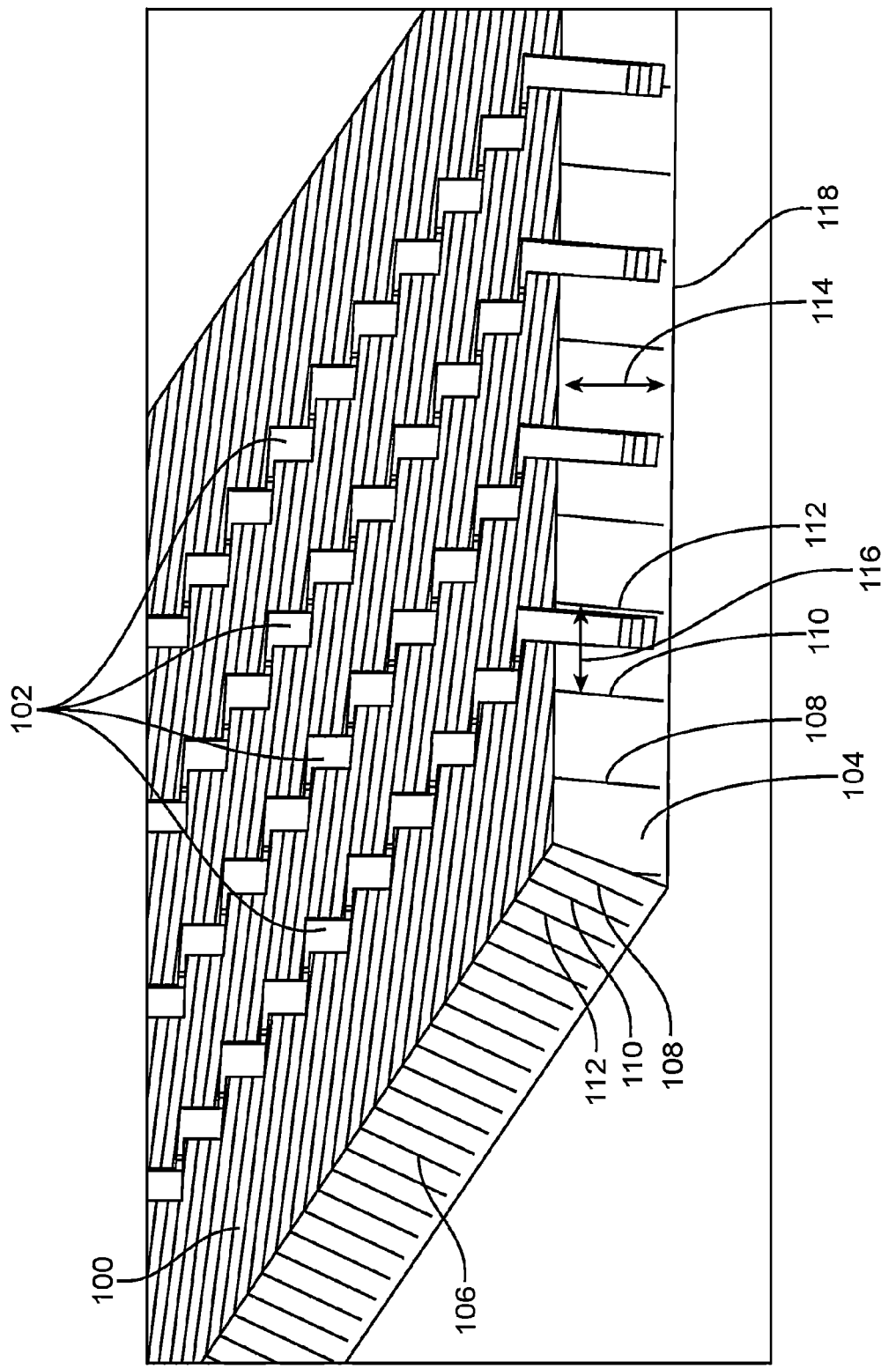
FIG. 1 is a perspective view of a tire tread, according to an exemplary embodiment.

Referring now to FIG. 1, a perspective view of a tire tread 100 is shown, according to an exemplary embodiment. The tire tread 100 includes a plurality of sipes. The sipes may be formed by a system configured to form sipes in the tire tread 100 through a variety of methods (cutting, slicing, molding, plunging, etc.). The tire tread 100 may be formed of a synthetic rubber, natural rubber, carbon black, or similar material or combination(s) of materials capable for being used as a tire. The tire tread 100 includes a plurality of grooves 102. The grooves 102 are channels within the tire tread 100. The grooves 102 provide the tire tread 100, when mounted on a tire that is mounted on a vehicle, additional grip in certain conditions (e.g., snow, mud, sand, etc.). The grooves 102 may also direct water out from under the tire to reduce the chance of a vehicle hydroplaning. The grooves 102 are formed during the tire tread molding process. The tire tread 100 defines a width face 104 across the width of the tire tread 100, and a length face 106 along the length of the tire tread 100.

The tire tread 100 includes a plurality of sipes. The sipes of the tire tread 100 include a first sipe 108. The first sipe 108 extends from the length face 106 to the width face 104. A second sipe 110 extends form the length face 106 to the width face 104. The second sipe 110 runs parallel to the first sipe 108 and is located farther down the length face 106, away from the width face 104. A third sipe 112 extends from the length face 106 to the width face 104. The third sipe 112 is parallel to the second sipe 110. The sipe distance 116, the distance between any two sipes, may be constant or may vary. In some embodiment, the tire tread 100 includes a number (e.g., 1, 2, 3, 4, 5, 6, 7, 8, 9, 10, 15, 20, 40, 50, 100, 200, 300, etc. or any number between any of the foregoing values) of sipes such that the entire length of the tire tread 100 includes sipes. In some embodiments, the sipes are arranged at different angles relative to one another. The sipes are formed to a sipe depth 114. In some embodiments, the sipe depth is approximately between about 0.25 inches and about 0.5 inches or between about 0.2 inches and about 0.55 inches. In some embodiments, the sipe depth 114 never extends past the tread rear 118, which defines a continuous surface along the tire tread 100.

Figure 2:
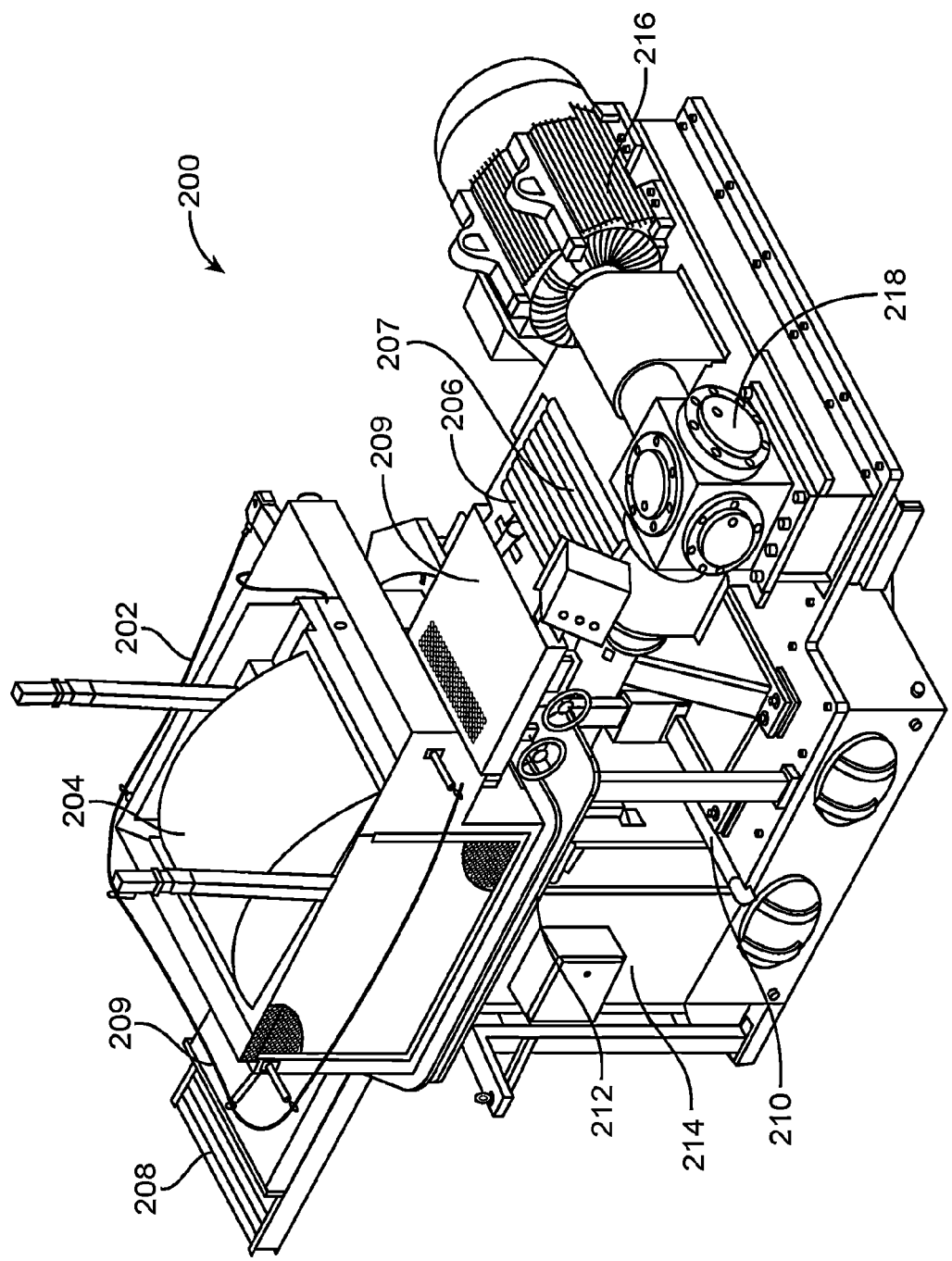
FIG. 2 is a perspective view of a system for forming sipes in a tire tread, according to an exemplary embodiment.

Referring now to FIG. 2, a perspective view of a sipe forming system 200 for forming sipes in a tire tread, such as the sipes in the tire tread 100, is shown, according to an exemplary embodiment. The sipe forming system 200 is configured to receive a tire tread and form (e.g., cut, slice, etc.) sipes in the tire tread. The sipe forming system 200 may be configured to cut sipes of varying angles (e.g., 5 degrees, 6 degrees, 7 degrees, 8 degrees, 9 degrees, 10 degrees, 15 degrees, 20 degrees, 25 degrees, 30 degrees, 35 degrees, etc. or any value therebetween) in the tire tread. In some embodiments, the sipe forming system 200 is controlled and reconfigured manually (e.g., by an operator).

In some embodiments, the sipe forming system 200 includes or is provided with a computer system. Various components of the sipe forming system 200 are operably coupled to and controlled by the computer system. The computer system may include at least a processor and a memory and may be operatively and communicably coupled to at least a portion of the components of the sipe forming system 200. In some embodiments, the computer system includes a plurality of sensors detecting states (e.g., position, temperature, configuration, etc.) of components of the sipe forming system 200. In some embodiments, the sipe forming system 200 includes a controller operated automatically by the computer system. In some embodiments, an operator inputs machine-readable instructions into the computer system to reconfigure and control the sipe forming system 200. For example, a sensor may detect a tire tread has been inserted into the sipe forming system 200, and if so, the computer system then commands the components of the sipe forming system 200 to feed the tire tread and form sipes in the tire tread without user input. In some embodiments, an operator may enter operating parameters into the computer system prior to the computer system, thereby automatically facilitating the siping process.

The sipe forming system 200 includes a positioning assembly 202 pivotally coupled to a cutting base 210. The positioning assembly 202 guides the tire tread through the sipe forming system 200. In some embodiments, the tire tread guided through the sipe forming system 200 already includes sipes, such as tire tread 100. In some embodiments, the tire tread guided through the sipe forming system 200 does not include any sipes. The positioning assembly 202 guides the tire tread during sipe forming. The positioning assembly 202 includes a housing 204 that provides structural support for a positioning device. The positioning device (e.g., the positioning device 1002 of FIG. 10) positions (e.g., align, orient, situate, etc.) the tire tread inside the housing 204 so sipes may be formed in the tire tread. In some embodiments, the positioning device is a mover that may take the form of a cylinder. The positioning device 202 may be an annular or cylindrical object, such as a tire, that is rotatably coupled to the housing 204, that provides a pressure to the tire tread inside the housing 204, preventing the tire tread from misaligning. The positioning device thus is configured as a form of a pressurizer or pressure applicator. For example, while a tire tread is fed through the housing 204, the positioning device contacts the tire tread and applies a force on the tire tread preventing the tire tread from misaligning. In some embodiments, the positioning device freely rotates. In some embodiments, the positioning device 202 is operably coupled to a motor that drives (e.g., rotates) the positioning device and allows the positioning device to feed the tire tread through the positioning assembly 202.

The positioning assembly 202 includes a feeding entrance 206. The feeding entrance 206 is configured to receive a tire tread and position the tire tread to be fed through the positioning assembly 202. The feeding entrance 206 includes a plurality of lower rollers 207 located along a tread plane. The tread plane corresponds to a plane along which the tire tread travels through the positioning assembly 202. In some embodiments, the feeding entrance 206 includes at least one top roller 209. The at least one top roller 209 is positioned such that a tire tread, traveling through the positioning assembly 202, is interposed between the at least one top roller 209 and the plurality of lower rollers by pressing the tire tread against the lower rollers 207. The feeding entrance 206 may include sidewalls that are perpendicular to the plurality of lower rollers that guide the tire tread into the housing 204. The sidewalls are positioned parallel to the direction in which the tire tread is fed through the positioning assembly 202.

The positioning assembly 202 further includes a feeding exit 208. The feeding exit 208 is configured to guide the tire tread, while the tire tread is exiting the housing 204, along the same plane the tire tread is inserted into the feeding entrance 206. The feeding exit 208 includes a plurality of lower rollers located along the tread plane. The feeding exit 208 may include at least one top roller 209. The at least one top roller 209 is positioned such that the tire tread traveling through the positioning assembly 202 is interposed between the at least one top roller 209 and the plurality of lower rollers. The at least one top roller 209 maintaining the tire tread along the tread plane by pressing the tire tread against the lower rollers 207. The feeding exit 208 may include sidewalls that are perpendicular (e.g., substantially perpendicular) to the plurality of lower rollers that guide the tire tread into the housing 204. The sidewalls are positioned parallel to the direction in which the tire tread is fed through the positioning assembly 202. In some embodiments, the feeding entrance 206 and the feeding exit 208 may be reversed.

The positioning assembly 202 is pivotally coupled to the cutting base 210. The cutting base 210 rotatably couples to the positioning assembly 202 and includes components configured for forming sipes in tire treads. The cutting base 210 includes a frame configured to distribute the weight of the components of the sipe forming system 200. The positioning assembly 202 rotates along a pivot plate 212. The pivot plate 212 is parallel to the plane along which the tire tread travels through the housing 204. Pivoting the positioning assembly 202 about the pivot plate 212 allows for the sipe forming system 200 to cut sipes on the tire tread at various angles. In some embodiments, the positioning assembly 202 is pivoted about the pivot plate 212 such that the cutting angle (relative to the direction in which the tire tread travels through the housing 204) is between approximately 5 degrees and 35 degrees relative to a perpendicular reference point. In some embodiments, the positioning assembly 202 is rotated by a motor that receives signals from a controller or a computer system. In some embodiments, the rotation of the positioning assembly 202 is performed without a controller or computer system (e.g., manually).

The cutting base 210 includes a drum that rotates about an axis parallel to the tread plane. As the drum rotates, a blade positioned on a surface of the drum forms a sipe in the tire tread. The cutting base 210 further includes a fluid tank 214. The fluid tank 214 is filled with a fluid used to clean and/or lubricate a blade (e.g., blade 1200 of FIG. 12). In some embodiments, the fluid inside the fluid tank 214 is water. In some embodiments, the fluid is a lubricant (e.g., mineral oil, synthetic oil, etc.). The cutting base 210 further includes a cutting drum (e.g., cutting drum 1004 of FIG. 10), the cutting drum includes at least one angled groove that function as a screw to engage the tread rear, such as tread rear 118, and advances the tire tread through the housing 204. The cutting drum includes a blade configured to extend radially from the cutting drum and extends circumferentially along an outer surface of the cutting drum. As the cutting drum rotates, the blade rotates circumferentially with the drum to form sipes in the tire tread. The cutting drum is configured to be partially submerged in the fluid of the fluid tank 214 such that the fluid of the fluid tank cleans and lubricates the blade of the cutting drum while the cutting drum rotates.

The sipe forming system 200 includes a motor 216 operably coupled to the cutting base 210. In some embodiments, the motor 216 is a component integrated into the cutting base 210. The motor 216 provides mechanical power to the sipe forming system 200. The motor 216 may be an electric motor (e.g., AC motor, DC motor, etc.). When the motor 216 is an electric motor, the motor 216 is coupled to a power source (e.g., prime mover, battery, engine, generator, power grid, outlet, etc.). In some embodiments, the motor 216 may be an engine (e.g., internal combustion engine, compression ignition engine, spark ignition engine, etc.). The motor 216 is coupled (e.g., fastened) to the cutting base 210 with a plurality of fasteners (e.g., bolts, screws, pins, etc.). The motor 216 is operably coupled to a transmission 218. The transmission 218 transfers power from the motor 216 to at least the cutting drum of the sipe forming system 200. The transmission 218 may be a variable transmission, an automated transmission, or a similar device. The transmission 218 drives the sipe forming system 200 to feed the tire tread through the sipe forming system 200. The transmission 218 may be operably coupled to the cutting drum of the cutting base 210 or may be operably coupled to the positioning assembly 202. In some embodiments, the transmission 218 is operably coupled to both the cutting drum of the cutting base 210 and the positioning assembly 202. In some embodiments, the transmission 218 is operably coupled to a motor configured to rotate the positioning assembly 202 about the cutting base 210.

Figure 3:
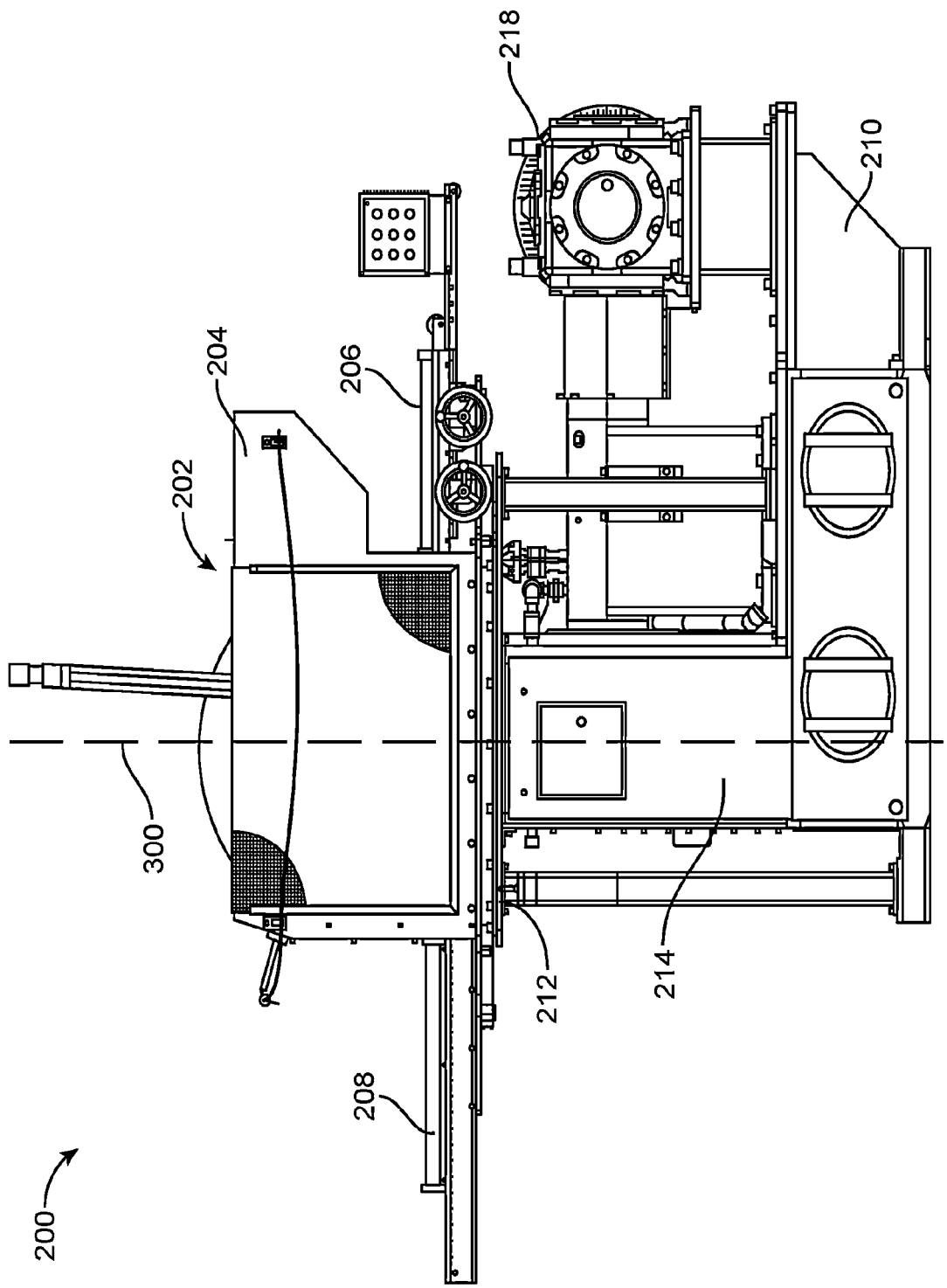
FIG. 3 is a side view of the system of FIG. 2.

Referring now to FIG. 3, a side view of the sipe forming system 200 of FIG. 2 is shown. The positioning assembly 202 is rotatably coupled to the cutting base 210, such that the positioning assembly 202 may rotate about a pivot axis 300. The pivot axis 300 is substantially aligned with a vertical center of the fluid tank 214. As the cutting drum is located partially submerged in the fluid tank 214, rotating the positioning assembly 202 about the pivot axis 300 allows for alterations to the sipe angle. The positioning assembly 202 is mounted to the cutting base 210 such that when rotated, the positioning assembly 202, or an inserted tire tread, does not interfere with another component of the sipe forming system 200. The sipe forming system 200 may include a locking device (e.g., buckle, pin, fastener, etc.) configured to lock the positioning assembly 202 to the cutting base 210. The locking device restrains the positioning assembly 202 from rotating out of a desired position.

Figure 4:
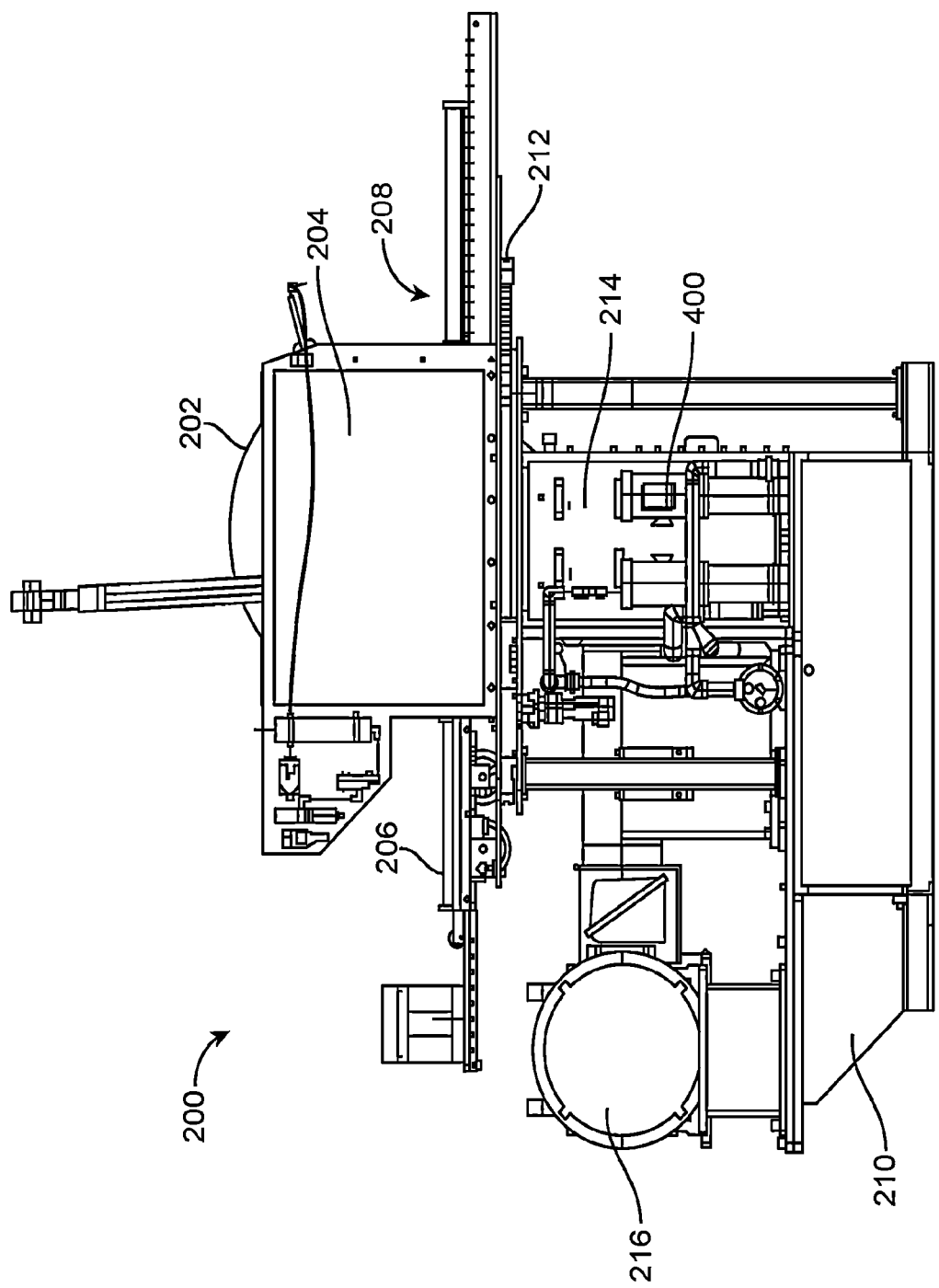
FIG. 4 is another side view of the system of FIG. 2.

Referring now to FIG. 4, a side view of the sipe forming system 200 of FIG. 2 is shown. The sipe forming system 200 further includes a fluid conditioning system 400 fluidly coupled to the fluid tank 214. The fluid conditioning system 400 monitors the state (e.g., temperature, pressure, etc.) of the fluid within the fluid tank 214. The fluid conditioning system 400 may clean the fluid by passing the fluid through a filter. In some embodiments, the fluid conditioning system 400 provides the fluid tank 214 with fresh (e.g., unused) fluid to replace the used fluid within the fluid tank 214. In some embodiments, the fluid conditioning system 400 adds lubricant (e.g. oil, silicone, etc.) or cleaning fluids (e.g., soap, abrasive cleaning medium, etc.) to the fluid tank 214.

Figure 5:
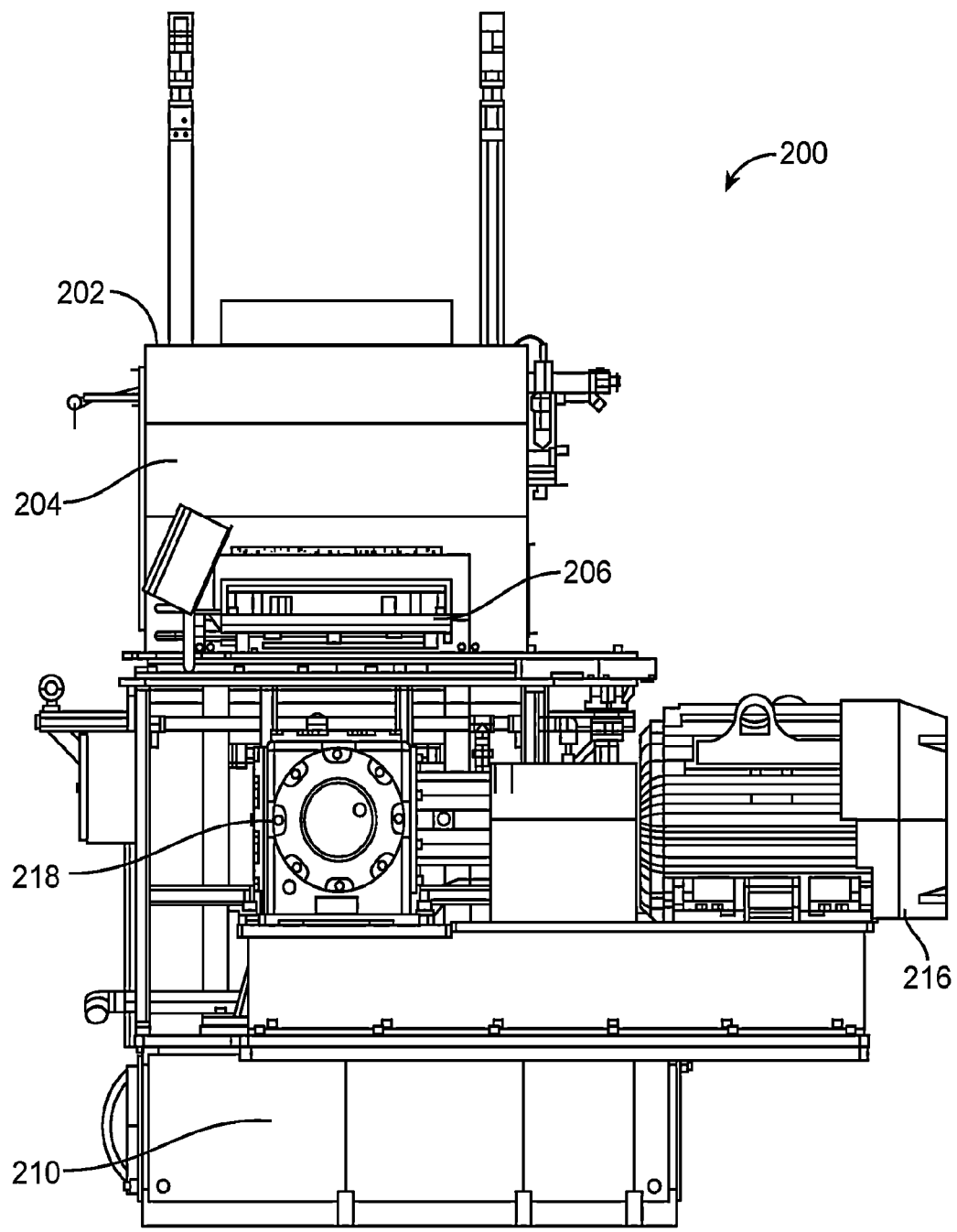
FIG. 5 is a front view of the system of FIG. 2.
Figure 6:
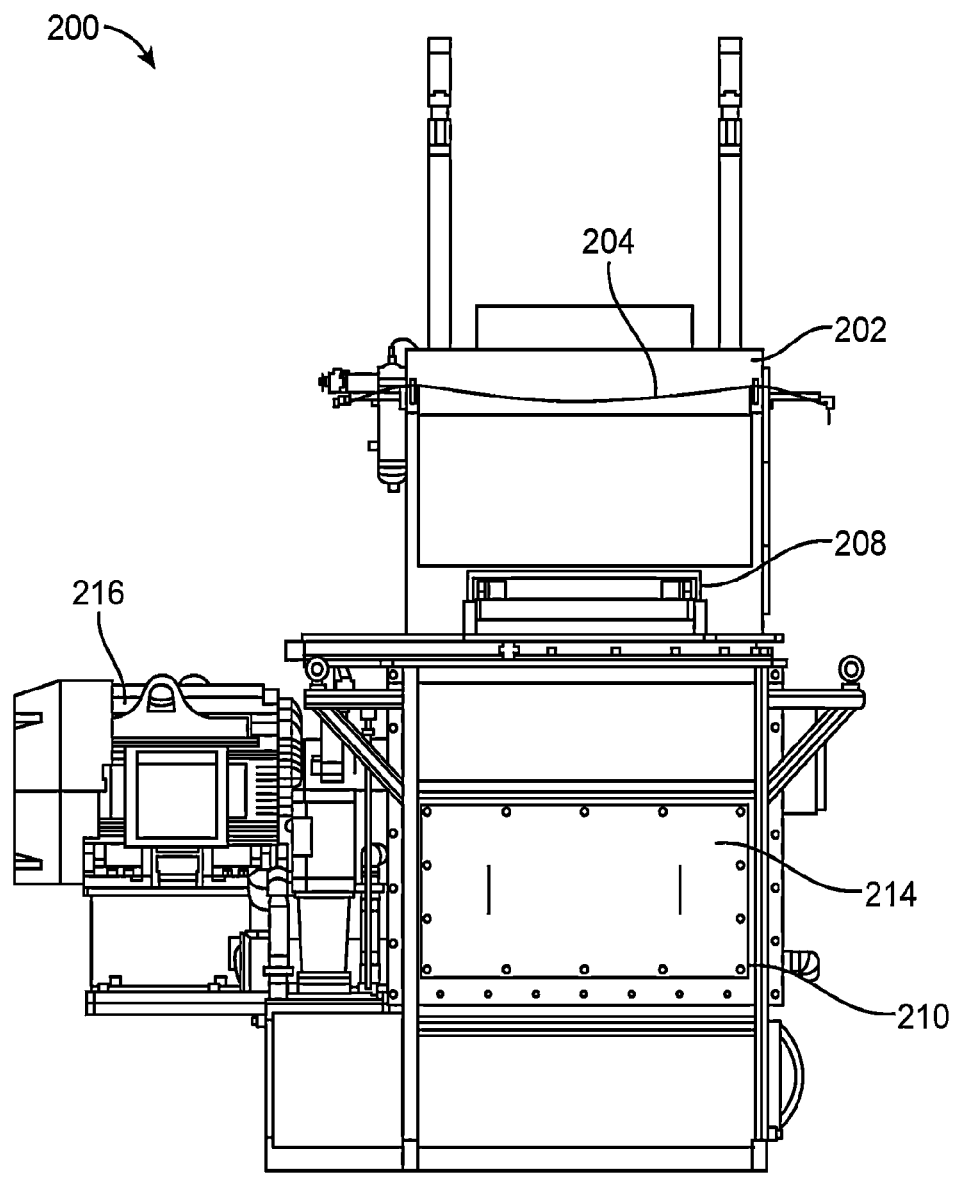
FIG. 6 is a back view of the system of FIG. 2.

Referring now to FIG. 5, a front view of the sipe forming system 200 of FIG. 2 is shown. The motor 216 and the transmission 218 are coupled to the cutting base 210 such that a tire tread inserted into the feeding entrance 206 can be inserted without obstruction. Referring now to FIG. 6, a back view of the sipe forming system 200 of FIG. 2 is shown. Similarly, the feeding exit 208 is positioned such that tire tread exiting the positioning assembly 202 may advance unobstructed.

Figure 7:
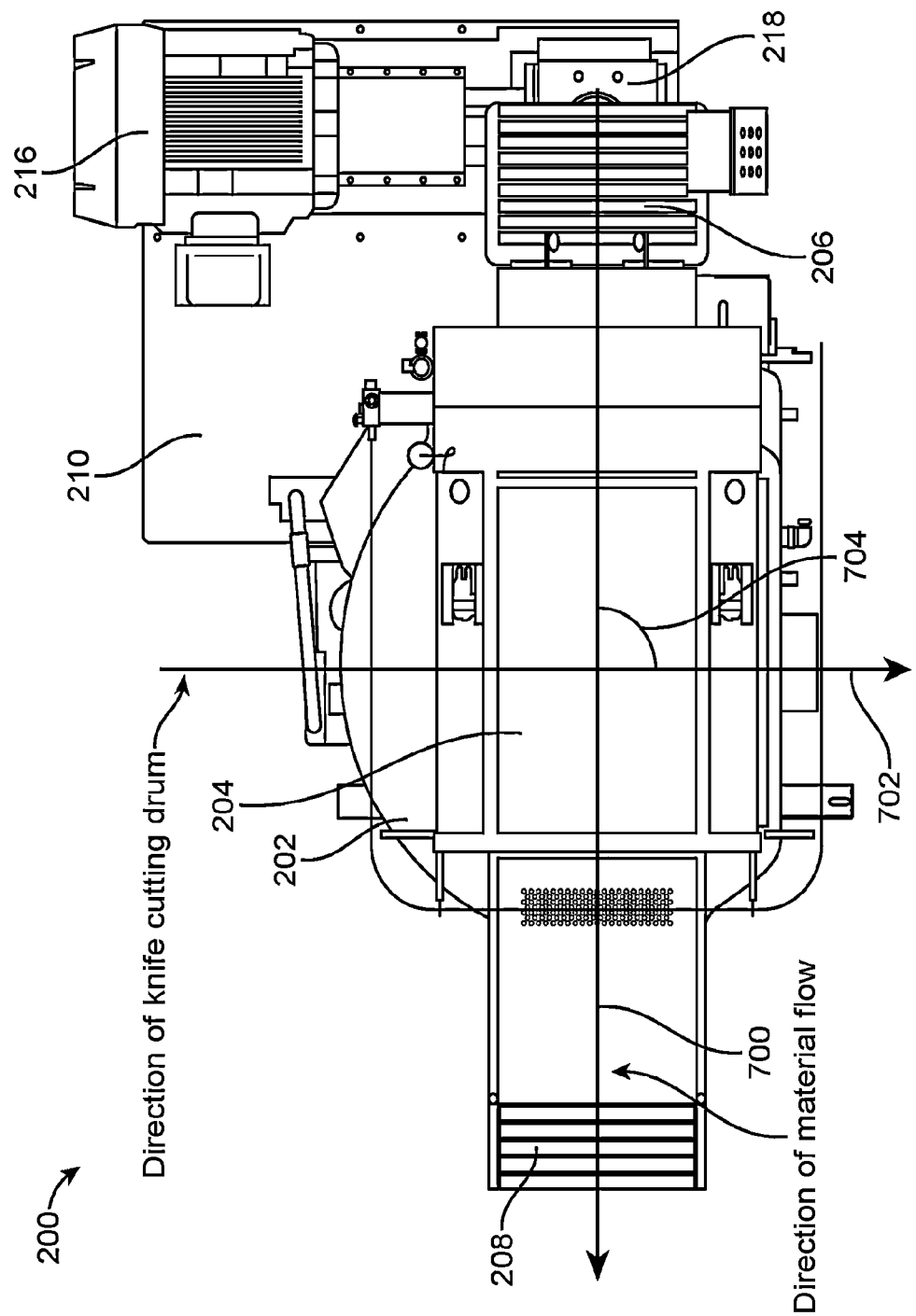
FIG. 7 is top view of the system of FIG. 2.
Figure 8:
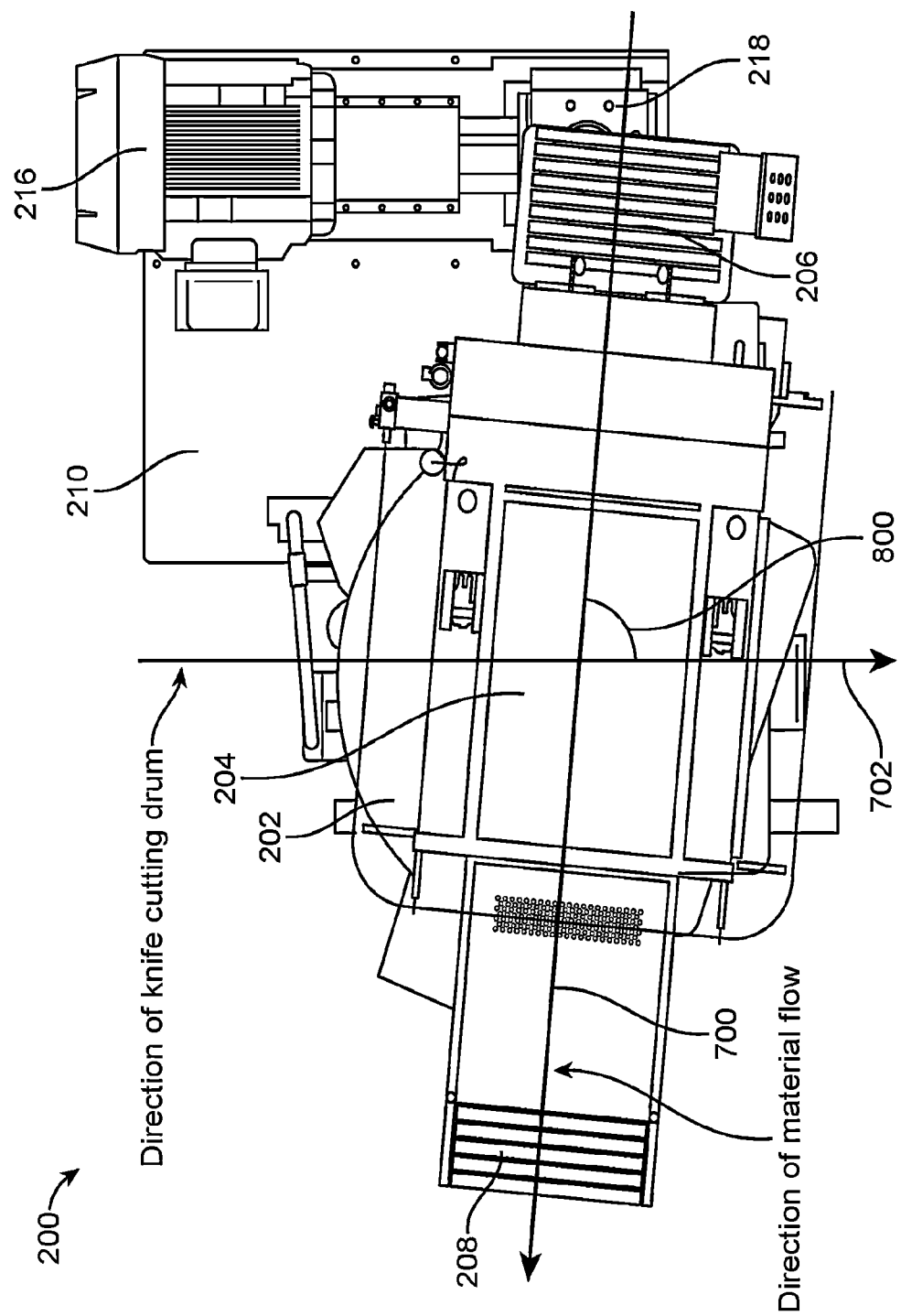
FIG. 8 is a top view of the system of FIG. 2 in an angled configuration.
Figure 9:
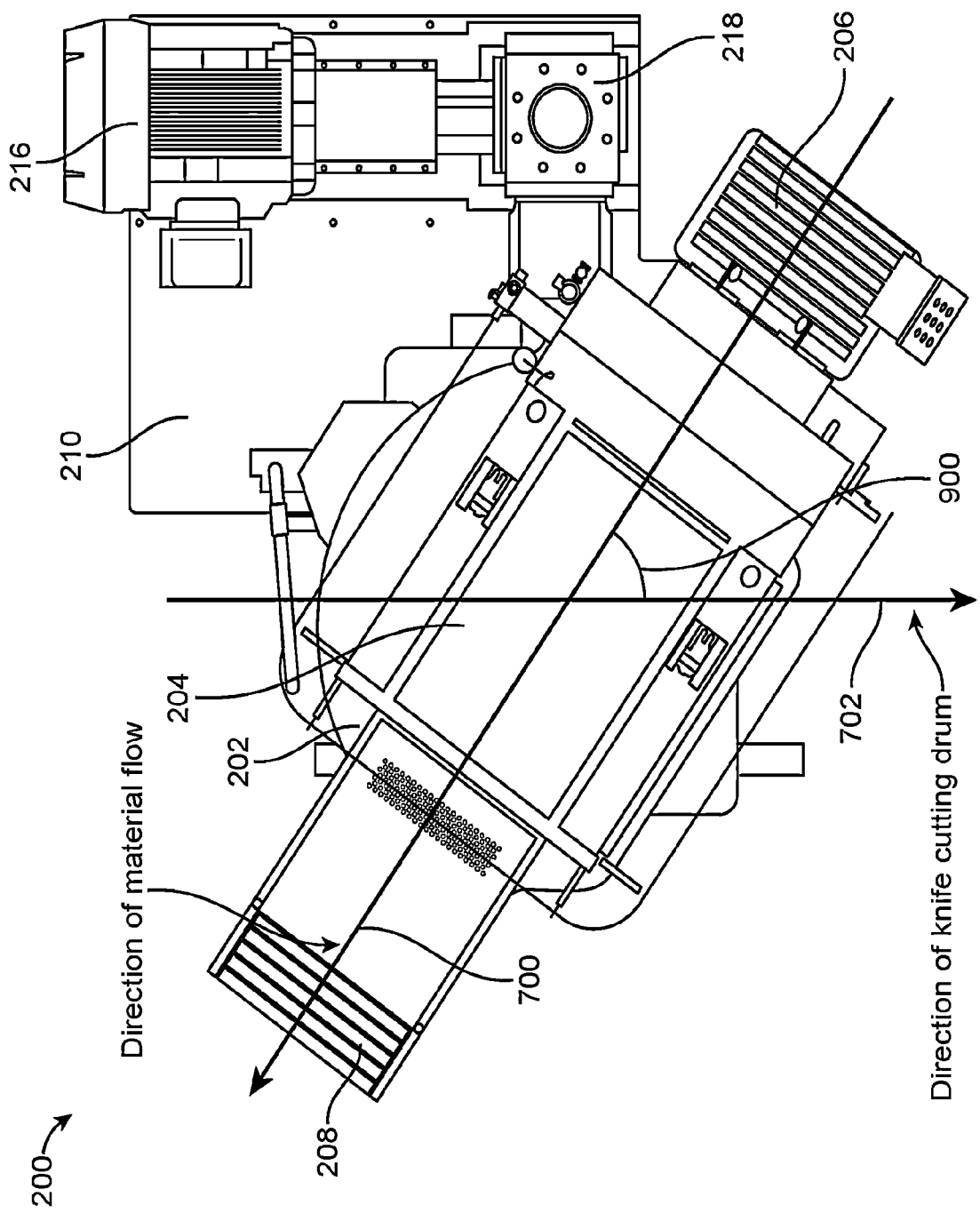
FIG. 9 is a top view of the system of FIG. 2 in another angled configuration.

Referring generally to FIGS. 7-9, the positioning assembly 202 is shown rotated relative to the cutting base 210. FIGS. 7-9 depict various configurations of the sipe forming system 200 where the position of the positioning assembly 202 is positioned in various different angle relative to a feeding axis 700 along which a tire tread is fed through the sipe forming system 200. The sipe forming system 200 may be rotated to the configurations depicted in FIGS. 7-9 or to a configuration other than those depicted in FIGS. 7-9.

Referring now to FIG. 7, a top view of the sipe forming system 200 of FIG. 2 is shown, according to an exemplary embodiment. The positioning assembly 202 defines the feeding axis 700 that corresponds to an axis along which tire tread 100 travels through the positioning assembly 202. The cutting base 210 further defines a cutting axis 702 that corresponds to the direction of rotation of the cutting drum. The feeding axis 700 and the cutting axis 702 define a first angle 704. In the embodiment of FIG. 7, the first angle 704 is a right angle (e.g., 90 degrees), wherein the feeding axis 700 and the cutting axis 702 are perpendicular. In this configuration, the cutting base 210 may form sipes in the tire tread that are perpendicular to the length of the tire tread. In some embodiments, the first angle 704 may be a different angle other than a right angle.

Referring now to FIG. 8, a top view of the sipe forming system 200 is shown, according to another exemplary embodiment. In the configuration of FIG. 8, the feeding axis 700 and the cutting axis 702 define a second angle 800. The second angle 800 corresponds to the acute angle formed by the feeding axis 700 and the cutting axis 702. The second angle 800 is smaller than the first angle 704 and produces sipes on the tire tread that are angled. The sipes produced by the configuration of FIG. 8 are more angled than the sipes produced by the configuration of FIG. 7 (e.g., an angle between the sipe and the width face 104 is greater than for the sipes of FIG. 7).

Referring now to FIG. 9, a top view of the sipe forming system 200 of FIG. 2 is shown, according to yet another exemplary embodiment. In the configuration of FIG. 9, the feeding axis 700 and the cutting axis 702 define a third angle 900. The third angle 900 corresponds to the acute angle formed by the feeding axis 700 and the cutting axis 702. The third angle 900 is smaller than the second angle 800 and produces sipes on the tire tread that are angled. The sipes produced by the configuration of FIG. 9 are more angled than the sipes produced by the configuration of FIG. 8.

Figure 10:
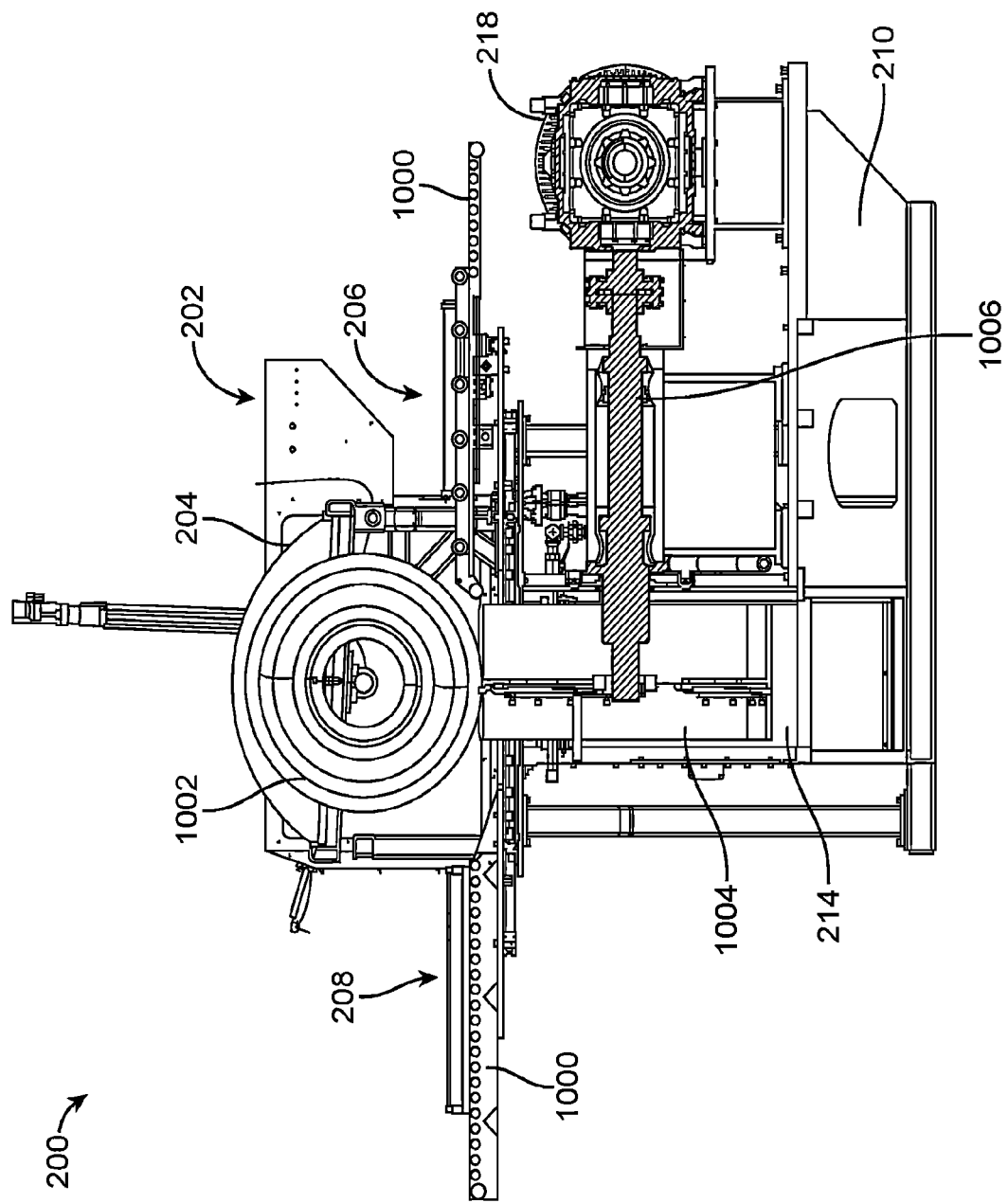
FIG. 10 is a side cross-sectional view of the system of FIG. 2.

Referring now to FIG. 10, a side section view of the sipe forming system 200 of FIG. 2 is shown. The section view shows a roller array 1000 included in both the feeding entrance 206 and the feeding exit 208. The roller arrays 1000 include a plurality of rollers arranged along a single plane. The plurality of rollers allow for a tire tread to roll into/out of the housing 204. Positioned inside of the housing 204 is the positioning device 1002. The positioning device 1002 is rotatably coupled to the housing 204 and configured to apply a force to the tire tread 100 as the tire tread 100 is engaged with the cutting drum 1004. In some embodiments, the positioning device 1002 is flexible (e.g., plastically deformable) to provide a pressing force into the tire tread with minimal deformation of the tire tread.

The section view also shows the cutting drum 1004 located within the fluid tank 214. The cutting drum 1004 and the positioning device 1002 are positioned such that the tire tread is interposed between the positioning device 1002 and the cutting drum 1004 as the tire tread translates through the sipe forming system 200. The cutting drum 1004 includes the blade used to form sipes in the tire tread. As the cutting drum 1004 rotates to form sipes in the tire tread, the blade cuts through the tire tread, forming sipes. The rotation of the cutting drum 1004 is operated by the motor 216 through the transmission 218. The transmission 218 includes a crankshaft 1006, and the crankshaft 1006 rotatably couples to the cutting drum 1004 to rotate the cutting drum 1004.

Figure 11:
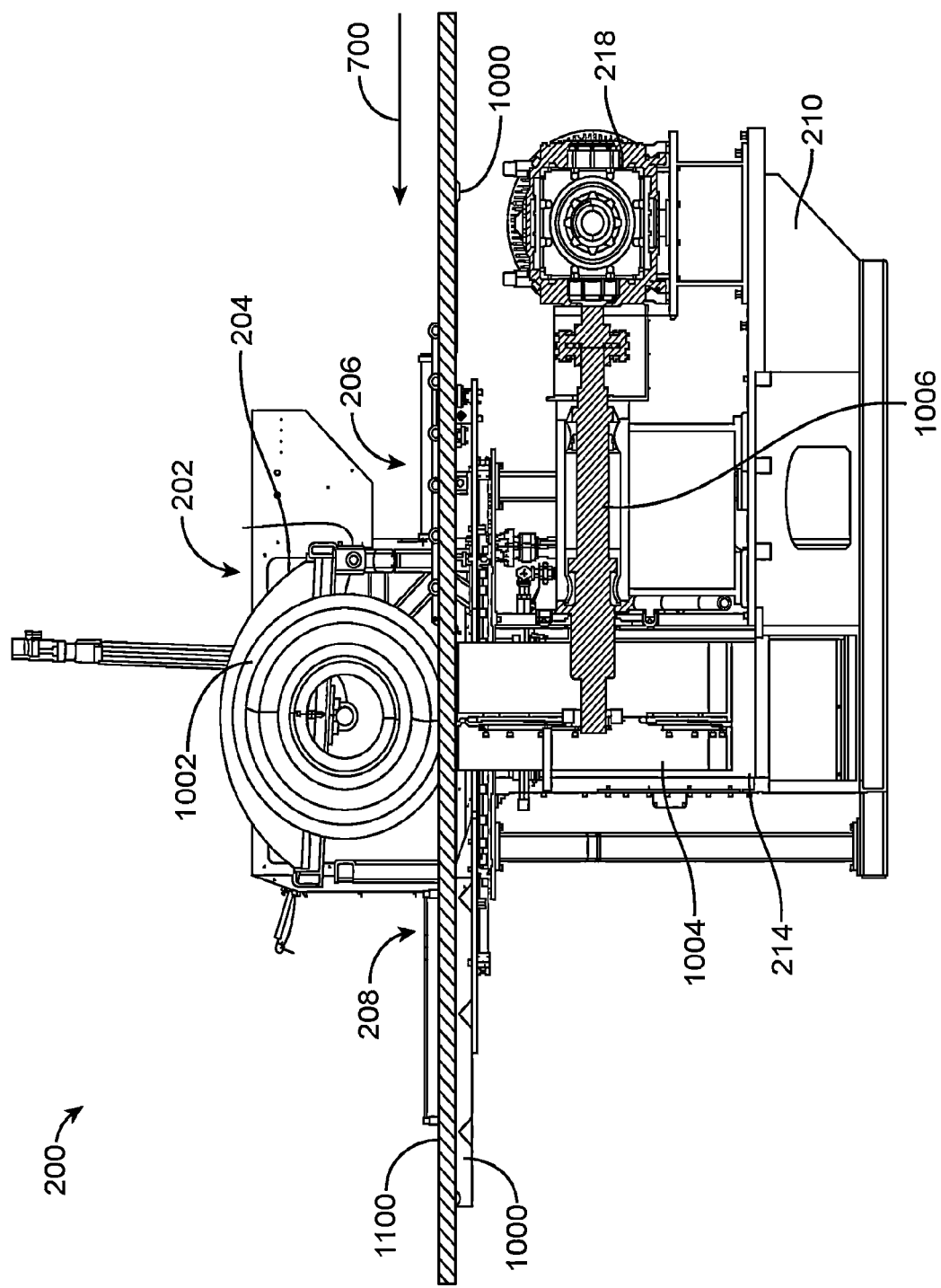
FIG. 11 is a side cross-sectional view of the system of FIG. 2 with an inserted tire tread.

Referring now to FIG. 11, a side section view of the sipe forming system 200 of FIG. 2 is shown with an inserted tire tread 1100, according to an exemplary embodiment. The tire tread 1100 travels through the sipe forming system 200 along the feeding axis 700. The tire tread 1100 may be a blank tire tread (e.g., without sipes) or may be a tire tread that has already gone through a sipe process (e.g., the tire tread 100). The tire tread 1100 enters the positioning assembly 202 along the roller array 1000 without sipes at the feeding entrance 206, then within the positioning assembly 202, sipes are formed on the tire tread 1100 by the cutting drum 1004. The tire tread 1100 is pressed between the positioning device 1002 and the cutting drum 1004. The pressing force provided by the positioning device 1002 allows for the cutting drum 1004 to produce deep (e.g., nearly to the tread rear) sipes. When inside the housing 204, the positioning device 1002 presses the tire tread 1100 toward the cutting drum 1004. More particularly, the positioning device 1002 presses the tire tread 1100 down onto (e.g., against) the cutting drum 1004. The rotation of the cutting drum 1004 advances the tire tread 1100 and forms sipes on the tire tread 1100. The tire tread 100, with the sipes formed therein, exits the sipe forming system 200 at the feeding exit 208 along the roller array 1000.

Figure 12:
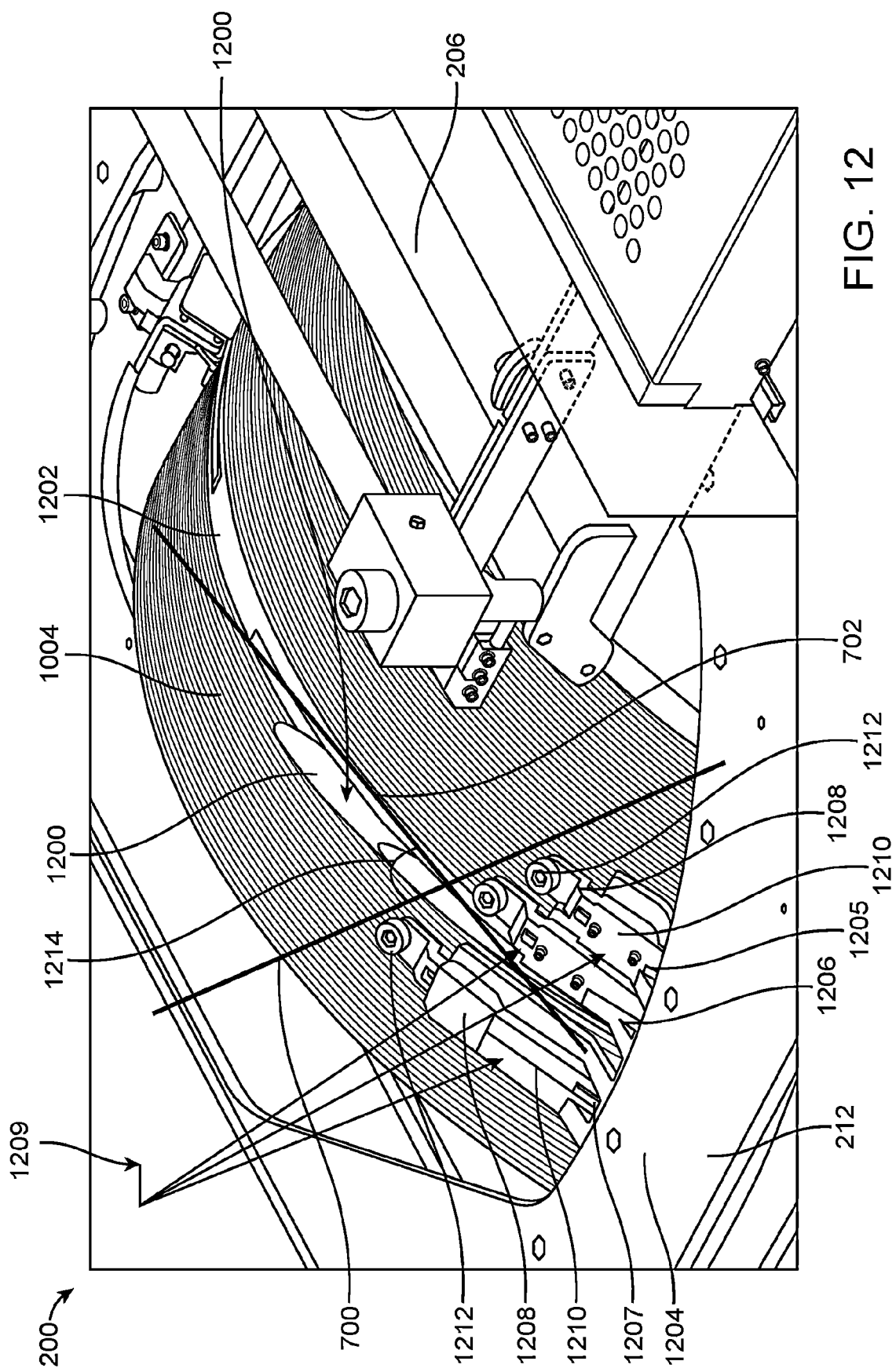
FIG. 12 is a perspective view of a drum of the system of FIG. 2 for forming sipes in a tire tread, according to an exemplary embodiment.

Referring now to FIG. 12, a perspective view of the cutting drum 1004 of the sipe forming system 200 of FIG. 2 is shown, according to an exemplary embodiment. In FIG. 12, the housing 204 is removed to show the cutting drum 1004. The surface of the cutting drum 1004 is threaded (e.g., similar to a screw) such that when the tire tread, such as tire tread 1100, is fed into the sipe forming system 200 while the cutting drum 1004 is rotating, the thread of the cutting drum 1004 engages a rear surface of the tire tread 1100. Further, when the tire tread 1100 is fed into the sipe forming system 200 during the rotation of the cutting drum 1004, the cutting drum 1004 advances the tire tread 1100 along the tread plane in a feeding direction from the feeding entrance 206 to the feeding exit 208. In some embodiments, the cutting drum 1004 rotates at about 400 rotations per minute (RPM) to about 600 RPM. In some embodiments, the rotation of the cutting drum 1004 advances the tire tread through the sipe forming system 200 at about 20 feet to about 30 feet per minute. In some embodiments, the rotational speed of the cutting drum 1004 is configured for the specific type of tire tread in which sipes are being formed.

The cutting drum 1004 includes a blade 1200 (e.g., knife, cutting tool, etc.). The blade 1200 may be formed of stainless steel, galvanized steel, titanium, or other metal or metal alloy that is at least partially resistant to corrosion when exposed to the fluid in the fluid tank 214. The blade 1200 is fixedly coupled to the cutting drum 1004 such that a cutting edge of the blade 1200 extends from the surface of the cutting drum 1004 along a cutting channel 1202. The cutting channel 1202 is located circumferentially along the center of the cutting drum 1004. The cutting channel 1202 is an unthreaded portion of the cutting drum. The blade 1200 is oriented on the cutting drum 1004 such that the blade 1200 forms sipes on the tire tread passing through the sipe forming system 200 while the cutting drum 1004 is rotating. In some embodiments, the blade 1200 forms sipes up to about 0.5 inches in depth. For example, the sipes so formed may be between about 0.25 to about 0.5 inches in depth, between about 0.4 to about 0.5 inches in depth, or between 0.33 to about 0.55 inches in depth. In some embodiments, the cutting drum 1004 may include a plurality of blades 1200 to form multiple sipes per rotation. In some embodiments, the plurality of blades 1200 are multiple sizes such that a first blade cuts to a certain depth, then a second blade cuts to a deeper depth, and so on until the sipe is formed to the correct depth.

The sipe forming system 200 further includes lateral support system 1204 configured to engage the length face of the tire tread, such as length face 106 of the tire tread 100, when the cutting drum 1004 is cutting sipes in the tire tread. When cutting deeper sipes, the friction caused by the blade cutting through the tire exerts a lateral load on the tire in a direction substantially parallel to the rotation direction of the cutting drum 1004. The lateral support system 1204 provides lateral support to the tire tread to prevent the tire tread from shifting while the blade 1200 travels through the tire tread. The lateral support system 1204 is coupled the pivot plate 212 such that lateral support system 1204 does not rotate along with the positioning assembly 202. The lateral support system 1204 is positioned to guide the tire tread and to provide stability and support for the tire tread during sipe formation by blade 1200. Maintaining lateral support of the tire tread may allow for deeper cuts in the tire tread to be formed efficiently and in a repeatable and consistent manner.

In some embodiments, the lateral support system 1204 includes a roller 1212. The roller 1212 rotates around a fastener (e.g., shoulder bolt, bushing, etc.) rotatably coupled to a coupling body 1208 of the lateral support system 1204. The rollers 1212 contact the tire tread and allows the tire tread to continue along feeding axis 700 while preventing the tire tread from deviating from the feeding axis 700. The lateral support system 1204 includes guides 1209 in the form of a first support 1205 (e.g., a first tread support guide, etc.), a second support 1206 (e.g., a second tread support guide, etc.), and a third support 1207 (e.g., a third tread support guide, etc.). The first support 1205 is positioned nearer to the feeding entrance 206 than both the second support 1206 and the third support 1207. The first support 1205 includes a coupling body 1208 coupled to the pivot plate 212 and a rail 1210 slidable within the coupling body 1208 and selectively fixed to the coupling body 1208, such as with a fastener. In other words, the rail 1210 telescopes within the coupling body 1208. The rail 1210 is selectively positionable to allow for the lateral support system 1204 to be reconfigured for different (relative to the cutting axis 702) feeding axes 700. The rails 1210 selectively couple the rollers 1212 to the coupling body 1208 through at least one fastener (e.g., bolt, pin, buckle, etc.). The coupling body 1208 is formed to match the circumferential shape of the cutting drum 1004. The rollers 1212 may be repositioned along the coupling bodies 1208 such that their positions correspond (e.g., the roller 1212 are parallel to) the feeding axis 700.

The angle formed between the rollers 1212 and the cutting axis 702 is the sipe angle 1214, wherein the sipe angle corresponds to the angle formed by the blade 1200 on the tire tread 1100. In some embodiments, the lateral support system 1204 is adjusted manually. In some embodiments, the lateral support system 1204 includes at least one motor coupled to a controller or a computer system that directs the motor to reposition the lateral support system 1204. In particular, the computer system may receive an input from a positioning sensor indicating a position of the lateral support system 1204 and may be configured to provide a command to the motor to alter a position of the lateral support system 1204 in three-dimensional coordinate space (x, y, z).

Figure 13:
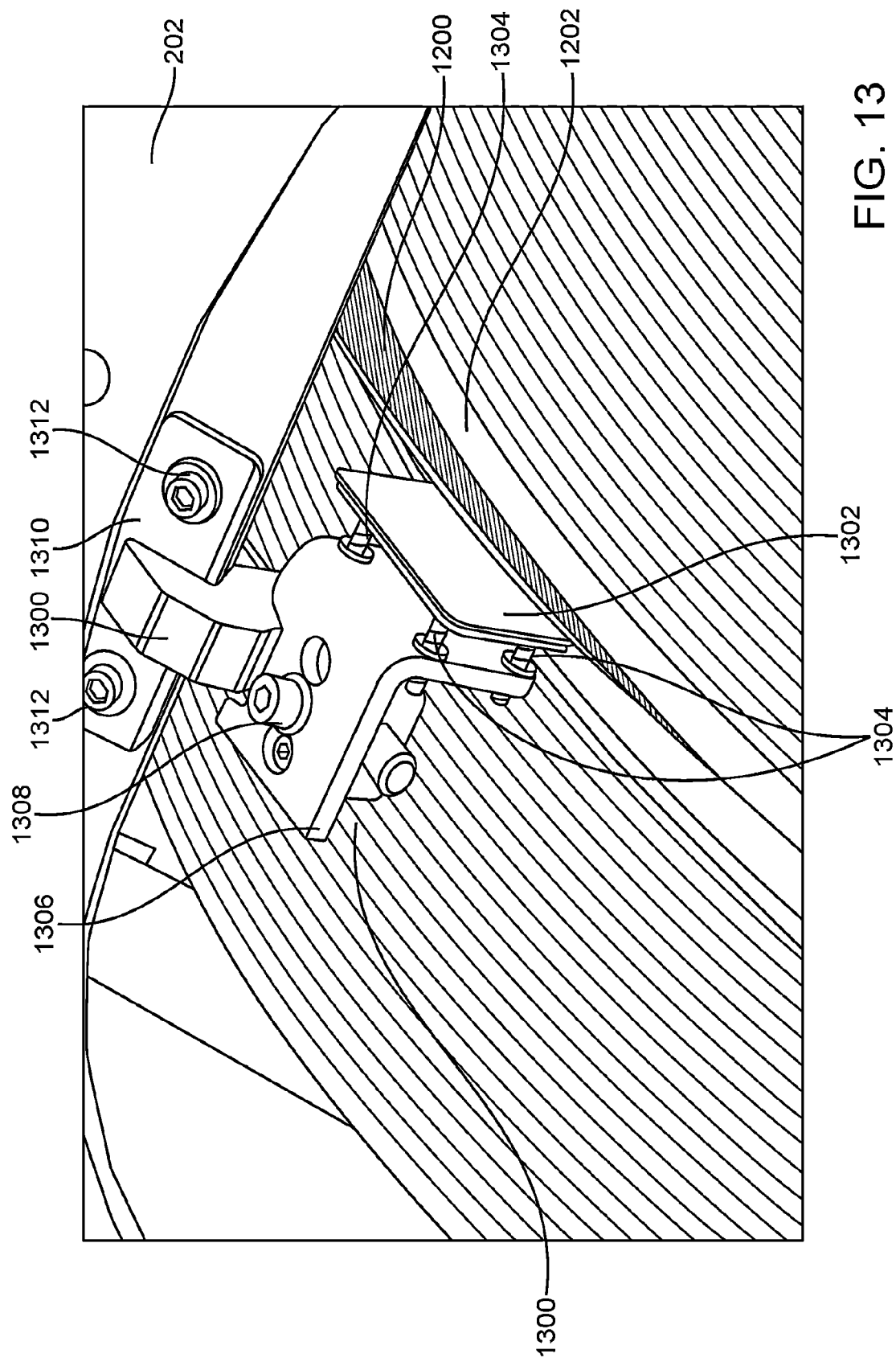
FIG. 13 is a perspective view of a sharpening tool of the system of FIG. 2.

Referring now to FIG. 13, a perspective view of a sharpening tool 1300 (sharpener) of the sipe forming system 200 of FIG. 2 is shown, according to an exemplary embodiment. The sharpening tool 1300 is coupled to the pivot plate 212 and is positioned in the same plane as the cutting channel 1202 such that the blade 1200 contacts the sharpening tool 1300 at regular intervals, e.g., after each rotation. The sharpening tool 1300 sharpens (e.g., hones, grinds, files, etc.) the blade 1200 after the blade rotates out of the fluid in the fluid tank 214 and just prior to extending into the tire tread 1100. In some embodiments, the sharpening tool 1300 is located such that the blade 1200 is sharpened directly after a sipe is formed and prior to rotating into the fluid tank 214. The sharpening tool 1300 may improve efficiency during the sipe formation process, as an operator does not have to stop the formation process to sharpen the blade 1200. Additionally, sharpening the blade 1200 at regular intervals (such as after every pass, e.g., each occurrence of the blade 1200 forming a sipe) increases the likelihood that the blade 1200 forms clean sipes (e.g., without jagged edges, etc.) sipes in the tire tread 1100 without substantially delaying the formation of sipes.

The sharpening tool 1300 includes a sharpening portion (e.g., whetstone, sharpening stone, sharpening surface, etc.) 1302. The sharpening portion 1302 is a formed of or coated with a coating such as a material that can sharpen the blade 1200. The sharpening portion 1302 may be further coated with a diamond grit, sand grit, or other type of coating that can improve the sharpening capability of the sharpening portion 1302. In some embodiments, the sharpening portion 1302 is formed of a material that may hone (e.g., straighten the edge of) the blade 1200, such as a fine, high-grit ceramic.

The contact between the sharpening portion 1302 and the blade 1200 may be held constant by at least one spring 1304 such that the sharpening portion 1302 and the blade 1200 are fixed in a relative positional relationship. The spring 1304 deforms while the blade 1200 is in contact with the sharpening portion 1302, allowing for the sharpening portion 1302 to translate and follow the shape of the blade 1200. The springs 1304 may be replaced or reconfigured to provide different stiffness(es) as needed. The springs 1304 include corresponding pins that couple the sharpening portion 1302 to a positioning bracket 1306. The positioning bracket 1306 is held in place by a positioning fastener 1308. The positioning fastener 1308 can be loosened to adjust the position of the positioning bracket 1306 and thus the sharpening portion 1302. The positioning fastener 1308 is tightened to lock the positioning bracket 1306 into place. The positioning fastener 1308 couples the positioning bracket 1306 to the mounting bracket 1310. The mounting bracket is coupled to the pivot plate 212 by mounting fasteners 1312. In some embodiments, the sharpening tool 1300 is coupled to the positioning assembly 202 via an adhesive, fastener, or similar mechanism. In some embodiments, the sharpening tool 1300 may be integrally formed with the positioning assembly 202.

Figure 14:
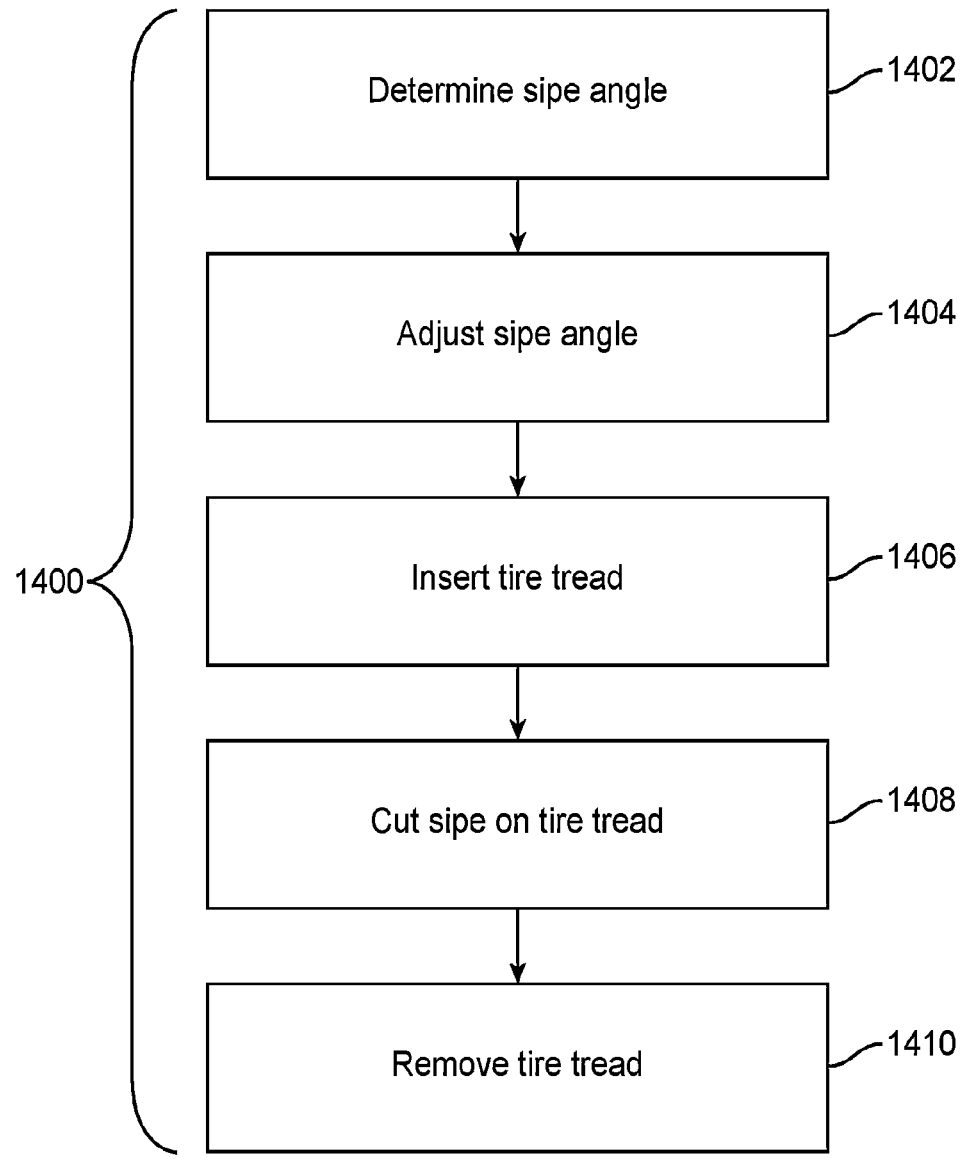
FIG. 14 is a flow diagram of a method of forming sipes in a tire tread, according to an exemplary embodiment.

Referring now to FIG. 14, a flow chart of a method 1400 for forming sipes in a tire tread is shown, according to an exemplary embodiment. The method 1400 allows for sipes to be formed in a tire tread at a specific angle by the sipe forming system 200. Various additional steps may be included in one or more embodiments without departing from the spirit of the foregoing exemplary method; further, the order of steps may be altered from what is depicted.

At 1402, the target sipe angle is determined (i.e., a desired sipe angle). For example, in some embodiments, the determination of the target sipe angle may be based on a result of an analysis of one or more characteristics of the tire tread (e.g., material, dimensions) and/or one or more usage parameters (e.g., weather conditions and/or terrain conditions). This determination is based on characteristics of the tire tread (e.g., material, size, etc.) as well as how the tire tread will be used (e.g., snowy conditions, muddy conditions, etc.). For example, the determination may be responsive to the tire tread being formed of synthetic rubber and intended for use in wet conditions. In some embodiments, a computer system is configured to receive data corresponding to the type of tire tread and how the tire tread will be used. Responsive to receiving the data, the computer system may automatically determine the correct (the target) sipe angle. The determination, either manually, or by a computer may involve comparing the characteristics and conditions to a lookup table or inputting into an algorithm to determine sipe angle and pattern.

Once the sipe angle is determined at 1402, the sipe angle is adjusted in the sipe forming system 200 at 1404. In some embodiments, a computer system may automatically send signals to components of the sipe forming system 200 to adjust the sipe forming system 200 to form sipes at the sipe angle. In some embodiments, the sipe forming system 200 is adjusted manually to form sipes at the sipe angle. To adjust the sipe forming system 200 to properly form sipes at the sipe angle, the positioning assembly 202 is adjusted (e.g., rotated) such that the angle between the feeding axis 700 and the cutting axis 702 corresponding to the sipe angle determined at 1402. The lateral support system 1204 are also adjusted such that the rollers 1212 of the lateral support system 1204 are parallel to the feeding axis 700, allowing the sipe forming system 200 to guide tire tread while sipes are formed. Adjusting the sipe angle in the sipe forming system 200 prepares the sipe forming system 200 for forming sipes in the tire tread.

Once the sipe angle is adjusted at 1404, a tire tread, such as tire tread 1100, is inserted into the sipe forming system 200 at the feeding entrance 206. The tire tread is oriented such that the channels of the tire tread contact the roller array 1000 of the feeding entrance 206 and, if include, between the sidewalls and the top rollers. The tire tread is inserted into the feeding entrance 206 along the feeding axis 700. In some embodiments, the sipe forming system 200 includes at least one indicator (e.g., light, audio device, etc.) that indicates whether the tire tread has properly been inserted into the sipe forming system 200. For example, if the tire tread has been improperly inserted, a red light may flash, and if the tire tread has been properly inserted, a green light may flash. Once the tire tread is inserted, the sipe forming system 200 is prepared to form sipes in the tire tread.

At 1408, the sipe forming system 200 forms sipes in the tire tread. The sipe forming system 200 is first powered on. In some embodiments, a user activates a power command (e.g., power button, switch, etc.) to activate the sipe forming system 200. In some embodiments, a computer system may automatically activate the sipe forming system 200 when a sensor detects that a tire tread is inserted into the sipe forming system 200. In some embodiments, the sipe forming system 200 is already powered on when the tire tread is inserted. Activating the sipe forming system 200 activates (e.g., sends current through) the motor 216 which powers the cutting drum 1004 through the transmission 218. The cutting drum 1004 rotates when powered. When rotating, the thread of the cutting drum 1004 advances the tire tread through the sipe forming system 200. Advancing the tire tread via the thread is similar to a worm screw advancing a worm gear. As the cutting drum 1004 rotates, the blade 1200 forms sipes in the tire tread. The positioning device of the positioning assembly 202 and the lateral support system 1204 keep the tire tread from deviating from the feeding axis 700 while the cutting drum 1004 advances the tire tread through the sipe forming system 200. The cutting drum 1004 advances and forms sipes in the tire tread until the tire tread exits the sipe forming system 200 through the feeding exit 208.

At 1410, the tire tread is removed from the sipe forming system 200 after the sipes have been formed. The tire tread exits the sipe forming system 200 through the feeding exit 208. The roller array 1000 of the feeding exit 208 support the tire tread traveling along the feeding axis 700 during sipe formation. Once the sipes have been formed along the entire length of the tire tread, the tire tread is removed from the sipe forming system 200. Once the sipes have been formed, the tire tread may be ready to be adhered to a tire carcass, or if additional sipes are needed, the tire tread may be fed through the sipe forming system 200 again at the different sipe angle.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled direction to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, and controller functionality described in connection with the embodiments disclosed herein may be implemented or performed with a general purpose single- or multi-chip processor, discrete hardware components, or any combination thereof designed to perform the functions described herein. In some embodiments, particular processes and methods may be performed by circuitry that is specific to a given function. The memory (e.g., memory, memory unit, storage device) may include on or more devices (e.g., RAM, ROM, Flash memory, hard disk storage) for storing data and/or computer code. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

Although the figures and description may illustrate a specific order of method steps, the order of such steps may differ from what is depicted and described, unless specified differently above. Also, two or more steps may be performed concurrently or with partial concurrence, unless specified differently above.

It is important to note that the construction and arrangement of the assembly as shown in the various exemplary embodiments is illustrative only. Additionally, any element disclosed in one embodiment may be incorporated or utilized with any other embodiment disclosed herein. For example, the sharpening tool of the exemplary embodiment described in reference to FIG. 7 may be incorporated in the assembly of the exemplary embodiment described in reference to FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sipe forming system comprising:
    a cutting base comprising:
        a pivot plate having an aperture;
        a cutting drum extending at least partially through the aperture;
        a blade coupled to a surface of the cutting drum; and
        a mechanical power source operably coupled to the cutting base and configured to rotate the cutting drum;
    a positioning assembly pivotally coupled to the cutting base and configured to receive a tire tread, the positioning assembly comprising:
        a housing, the housing being selectively positionable relative to the pivot plate; and
        at least one positioning device configured to position the tire tread received by the positioning assembly with respect to the cutting drum; and
    a first lateral support coupled to the pivot plate and configured to engage a length face defining an edge of the tire tread when the tire tread is positioned by the at least one positioning device.

2. The sipe forming system of claim 1, further comprising a sharpening tool coupled to the cutting base, the sharpening tool configured to engage the blade as the cutting drum rotates.

3. The sipe forming system of claim 1, further comprising a rail, wherein the first lateral support is configured to translate along the rail to alter the position of the first lateral support in a lateral direction.

4. The sipe forming system of claim 1, wherein the cutting drum further comprises a drum thread extending circumferentially about the surface of the cutting drum, wherein the drum thread is configured to engage a rear surface of the tire tread and to advance the tire tread through the positioning assembly as the cutting drum rotates.

5. The sipe forming system of claim 1, wherein the mechanical power source further comprises a motor and a transmission, the transmission operably coupled to the cutting drum.

6. The sipe forming system of claim 1, wherein the at least one positioning device comprises a feeding entrance and a feeding exit configured to direct the tire tread along a feeding direction from the feeding entrance to the feeding exit.

7. The sipe forming system of claim 1, wherein the cutting base further comprises a fluid tank disposed such that the cutting drum is partially submerged in the fluid tank.

8. The sipe forming system of claim 1, wherein a sharpening tool is arranged with a spring configured to position the sharpening tool with respect to the blade.

9. The sipe forming system of claim 8, wherein the sharpening tool includes a coating.

10. The sipe forming system of claim 1, wherein a sharpening tool comprises:
    a sharpening stone; and
    at least one spring coupled to the sharpening stone, wherein the at least one spring is configured to press the sharpening stone against the blade.

11. The sipe forming system of claim 8, wherein the at least one positioning device is formed annularly and is shaped so as to engage the tire tread.

12. A method of forming a sipe using the sipe forming system of claim 1, the method comprising:
    feeding a first tire tread through the positioning assembly; and
    rotating the cutting drum to cut a sipe in the first tire tread using the blade.

13. The sipe forming system of claim 1, further comprising a second lateral support coupled to the pivot plate and configured to engage the length face of the tire tread when the tire tread is positioned by the at least one positioning device, wherein each lateral support is configured to translate along a rail to adjust a position of the respective lateral support relative to the blade.

14. The sipe forming system of claim 13, wherein the first lateral support comprises a first roller and the second lateral support comprises a second roller, each roller configured to contact the length face of the tire tread when the tire tread is positioned by the at least one positioning device.

15. The sipe forming system of claim 14, wherein the positioning assembly comprises sidewalls configured to guide the tire tread into the housing along a feeding axis, wherein the first lateral support and the second lateral support are positionable such that a line from the first roller to the second roller is parallel to the feeding axis when the positioning assembly is in a first rotational position and when the positioning assembly is in a second rotational position.

16. The sipe forming system of claim 1, wherein the first lateral support is not configured to rotate with the positioning assembly with respect to the cutting drum, wherein the first lateral support is configured to resist a lateral load exerted by the blade on the tire tread when the cutting drum is rotated such that the blade cuts the tire tread.

* * * * *